US008704857B2

(12) United States Patent
Lv

(10) Patent No.: US 8,704,857 B2
(45) Date of Patent: Apr. 22, 2014

(54) THREE-DIMENSIONAL DISPLAY DEVICE, MOBILE TERMINAL AND THREE-DIMENSIONAL DISPLAY TRACKING METHOD

(75) Inventor: Xiaowei Lv, Shenzhen (CN)

(73) Assignee: SuperD Co. Ltd., Shenzhen (CN)

( * ) Notice: Subject to any disclaimer, the term of this patent is extended or adjusted under 35 U.S.C. 154(b) by 668 days.

(21) Appl. No.: 12/981,937

(22) Filed: Dec. 30, 2010

(65) Prior Publication Data

US 2012/0007853 A1 Jan. 12, 2012

(30) Foreign Application Priority Data

Jul. 7, 2010 (CN) ........................ 2010 1 02305044

(51) Int. Cl.
*G09G 5/00* (2006.01)

(52) U.S. Cl.
USPC ........................................... 345/677; 345/679

(58) Field of Classification Search
None
See application file for complete search history.

(56) References Cited

U.S. PATENT DOCUMENTS

| | | | | |
|---|---|---|---|---|
| 2006/0171033 | A1* | 8/2006 | Schreder et al. | 359/566 |
| 2008/0030360 | A1* | 2/2008 | Griffin | 340/689 |
| 2010/0138766 | A1* | 6/2010 | Nakajima | 715/767 |

FOREIGN PATENT DOCUMENTS

| | | | |
|---|---|---|---|
| JP | 11-234705 | A | 8/1999 |
| JP | 2000-122635 | A | 4/2000 |
| JP | 2001-142445 | A | 5/2001 |
| WO | 2008030005 | A1 | 3/2008 |

* cited by examiner

*Primary Examiner* — Kee M Tung
*Assistant Examiner* — Michelle Chin
(74) *Attorney, Agent, or Firm* — Anova Law Group, PLLC

(57) ABSTRACT

A three-dimensional display device is provided in the present disclosure. The three-dimensional display device includes an image displaying device, an optical control element, a direction sensor and a control unit. The optical control element is positioned on a surface of the image displaying device, the direction sensor measures and inclination angle of the display panel, and the control unit adjusts images displayed by the image displaying device according to the inclination angle. The three-dimensional display device of the present disclosure has the advantages of fast tracking speed, high tracking precision and low cost. A mobile terminal and a three-dimensional display tracking method are also provided in the present disclosure.

9 Claims, 3 Drawing Sheets

THREE-DIMENSIONAL DISPLAY DEVICE, MOBILE TERMINAL AND THREE-DIMENSIONAL DISPLAY TRACKING METHOD

TECHNICAL FIELD

The present disclosure generally relates to a three-dimensional display device, a mobile terminal and a three-dimensional display tracking method, and more particularly relates to a small sized three-dimensional display device, a small sized mobile terminal and three-dimensional display tracking methods thereof.

BACKGROUND

There is a distance between left and right eyes of an observer, which results in a small difference between visual angles of the two eyes. Such difference may cause sceneries observed by the left and right eyes to have a slight displacement, so as to generate a three-dimensional image in the observer's cerebrum.

Recently, naked-eye three-dimensional display techniques gain more and more attentions from people. Display panels are developed increasingly towards three-dimensional displaying. Three-dimensional display technique for mobile telephone panels particularly gains attentions. Because the mobile telephone panels have small sizes, it is easily to make the observer feel dizziness due to switching during three-dimensional displaying. Accordingly, a three-dimensional image may not be observed. Therefore, a three-dimensional displaying with tracking technique is selected, so that the observer may observe an optimal three-dimensional image when the mobile telephone is observed at different positions. Such tracking technique brings a new breakthrough to the three-dimensional display technique for mobile telephones.

In an existing mobile telephone, a three-dimensional display tracking technique tracks the observer's face using a camera arranged in the mobile telephone. Position information of the observer's face is caught via the camera, and then an optimal three-dimensional display effect is provided to the observer after image processing and software debugging.

However, this existing three-dimensional display tracking technique has many limitations for a display apparatus with a smaller display panel such as the mobile telephone. Firstly, the camera of the mobile telephone is generally mounted on the back face thereof, while the display panel is mounted on the front face thereof. However, the existing three-dimensional display tracking technique needs the camera and the display panel to be located at the same side. Therefore, the mobile telephone with the display panel mounted on the back face thereof may not track different positions of the observer accurately. Secondly, a tracking technique for the existing camera needs a relatively complex running process such as detecting, recognizing and tracking of an image, which brings a large number of data processing and occupies more resource for computing. Therefore, the requirement of a quick tracking speed may not be met.

BRIEF SUMMARY OF THE PRESENT DISCLOSURE

An embodiment of the present disclosure is to provide a three-dimensional display. The three-dimensional display device includes an image displaying device and an optical control element positioned on a surface of the image displaying device. The three-dimensional display device further includes a direction sensor and a control unit. The direction sensor measures an inclination angle of the image displaying device, and the control unit adjusts images displayed by the image displaying device according to the inclination angle.

Another embodiment of the present disclosure is to provide a mobile terminal. The mobile terminal including the three-dimensional display device described above.

Another embodiment of the present disclosure is to provide a three-dimensional display tracking method. The three-dimensional display tracking method includes the following steps: measuring an inclination angle of an image displaying device of a three-dimensional display device; and adjusting images outputted by the image displaying device in a currently inclined state according to the inclination angle.

BRIEF DESCRIPTION OF THE DRAWINGS

The components in the drawing are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF EMBODIMENTS

Reference will now be made to the drawings to described exemplary embodiments in detail.

Figure 1:
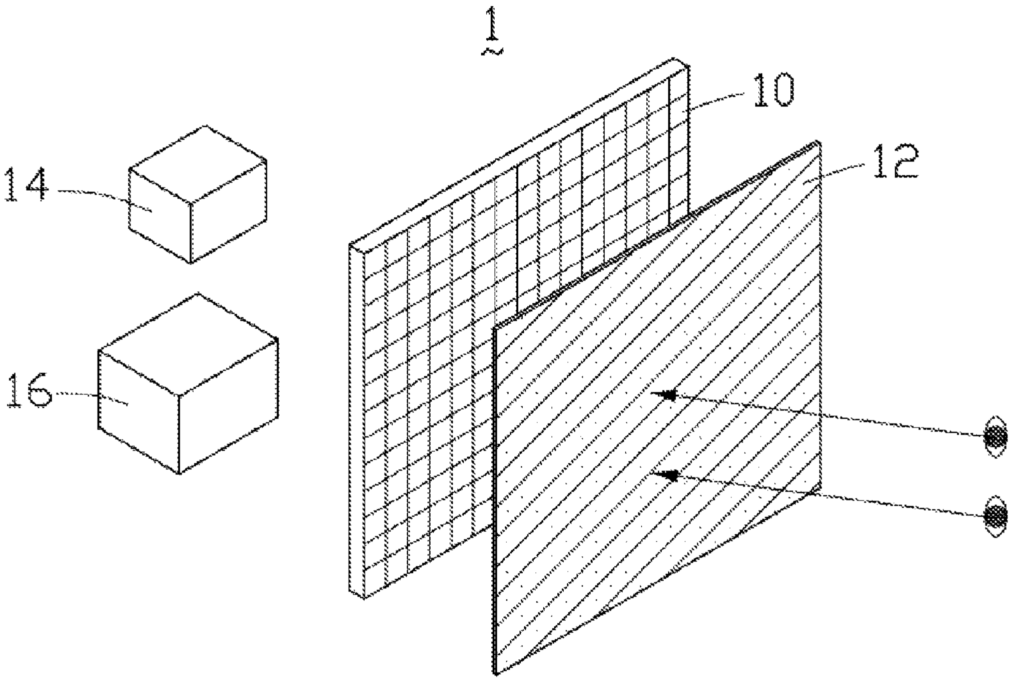
FIG. 1 is a perspective, exploded schematic view of a preferred embodiment of a three-dimensional display device according to the present disclosure.

Referring to FIG. 1, a perspective, exploded schematic view of a preferred embodiment of a three-dimensional display device according to the present disclosure is shown. The three-dimensional display device 1 may include a display panel 10, a cylindrical lens grating 12, a gravity sensor 14 and a control unit 16. In the present embodiment, the three-dimensional display device 1 is described as a mobile telephone exemplarily. It is understood that the three-dimensional display device 1 of the present disclosure may not only be applied to the mobile telephone, but also be applied to a mobile terminal such as a personal digital assistant (PDA).

Figure 2:
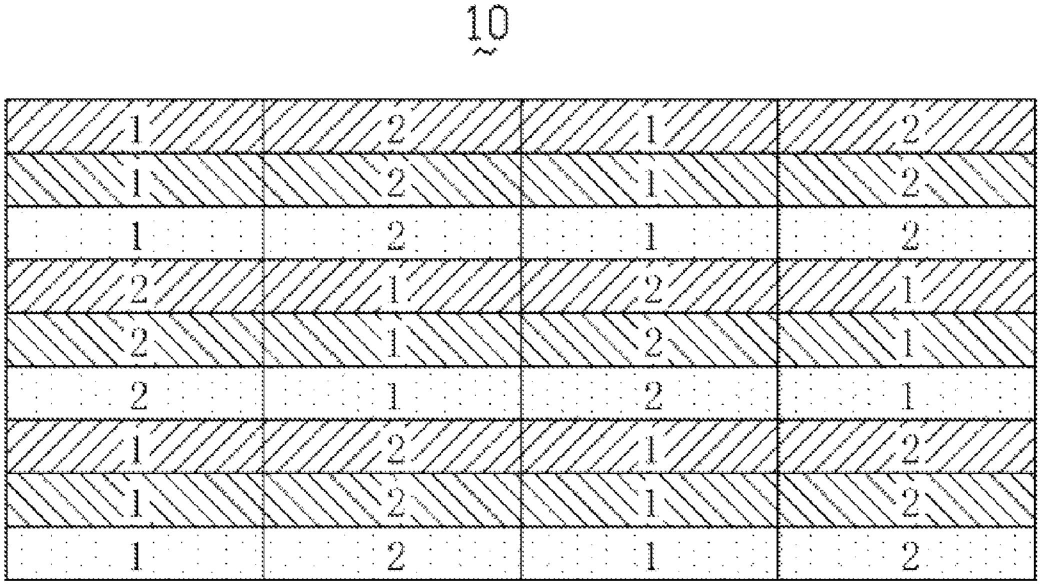
FIG. 2 is two images shown in a display panel of the three-dimensional display device of FIG. 1.

The display panel 10 may be a display apparatus with tricolor of red, green and blue, which may be used as an image displaying device such as a liquid crystal display (LCD), an organic electroluminescence display (OELD), a plasma display panel (PDP), a light emitting diode (LED), a vacuum fluorescent display (VFD), a field emission display (FED), a liquid crystal panel on silicon (LCOS), a digital light procession (DLP), a cathode ray tube (CRT) etc. Also referring to FIG. 2, the display panel 10 arranges two images in a manner of inclined interpolation via software interpolation. As desired, for example in order to make the observer observe an image displayed by the display panel 10 most comfortably, a transverse period and right-and-left movement of the two images may be adjusted by the control unit 16. Thus, it is convenient to achieve an optimal effect for observing.

The cylindrical lens grating 12 is an optical control element, and is mainly used for naked-eye three-dimensional displaying in the present disclosure. The cylindrical lens grating 12 may comprise a plurality of micro cylindrical lenses. An extension direction of the micro cylinder lenses inclines to a pixel extension direction of the display panel. The cylindrical lens grating 12 may cause pixels in each grating period of the display panel 10 to form images separately by controlling the grating pitch of the cylindrical lens grating 12 and a distance between the cylindrical lens grating 12 and the display panel 10. The images formed come into left and right eyes of the observer respectively. For example, the cylindrical lens grating 12 guides light beams of one of two images arranged by the display panel 10 to the observer's left eye, and guides the other of the two images to the observer's right eye. Then, a three-dimensional effect may be formed through synthesizing of the observer's cerebrum. Of course, the cylindrical lens grating is described in this embodiment as an example. However, it should not be used to limit the present disclosure. Other suitable gratings (such as a slit grating) and optical elements may also be applied to the present disclosure.

The gravity sensor 14 may be a direction sensor positioned in the three-dimensional display device 1, which is used for detecting an inclination direction of the three-dimensional display device 1. Because the display panel 10 is fitted in the three-dimensional display device 1, the inclination direction of the three-dimensional display device 1 is that of the display panel 10. The gravity sensor 14 may be a miniature and precise micro electro mechanical system (MEMS) device, which may detect a current pose (for example, standing, horizontal, inclining, etc.) of the display panel 10 using the gravity and transform movement or weight into electrical signal for measuring parameters such as inclination angle, inertial force, impingement, shake, etc. A level measurement precision of the gravity sensor 14 may be up to 0.002 radians. Further, an inclination and direction of the platform with respect to datum plane may be obtained at one time via programming in advance and measuring different directions of the platform utilizing multiple sensors, as follows.

When measuring the inclination angle of the platform, the gravity sensor 14 is placed on the platform perpendicularly (i.e., the gravity sensor 14 is perpendicular to the surface of the platform), and a sensitive axis of the gravity sensor 14 is consistent with an inclination axis of the platform. The sensitive axis of the gravity sensor 14 should be parallel to the horizontal in an aclinic state.

Figure 3:
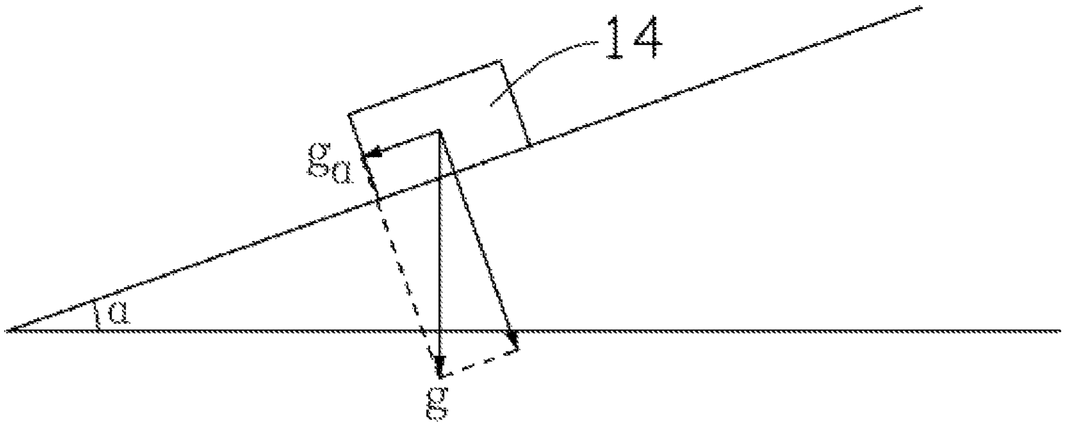
FIG. 3 is a schematic view of measuring a level inclination angle of a plane using a gravity inductor of the three-dimensional display device shown in FIG. 1.

In FIG. 3, $\alpha$ is an inclination angle of the platform with respect to a horizontal direction. A mass of the gravity sensor 14 has an acceleration component $g_\alpha$ in the inclination direction, wherein $g_\alpha = g \sin \alpha$ (g is acceleration of gravity). The mass of the gravity sensor 14 generates an excursion under the action of the acceleration component $g \sin \alpha$, such that an output voltage of the gravity sensor 14 is changed. If an output voltage of the gravity sensor 14 in an aclinic state is $V_0$, an output voltage of the gravity sensor 14 in an inclination state is $V_\alpha$, and an output voltage of the gravity sensor 14 under the action of 1 g acceleration, an equation (1) may be obtained:

$$V_\alpha = (V/g) g \sin \alpha + V_0 \quad (1)$$

Further, an level inclination angle $\alpha$ of the platform may be obtained, i.e., $\alpha = \arcsin [(V_\alpha - V_0)/V]$.

Figure 4:
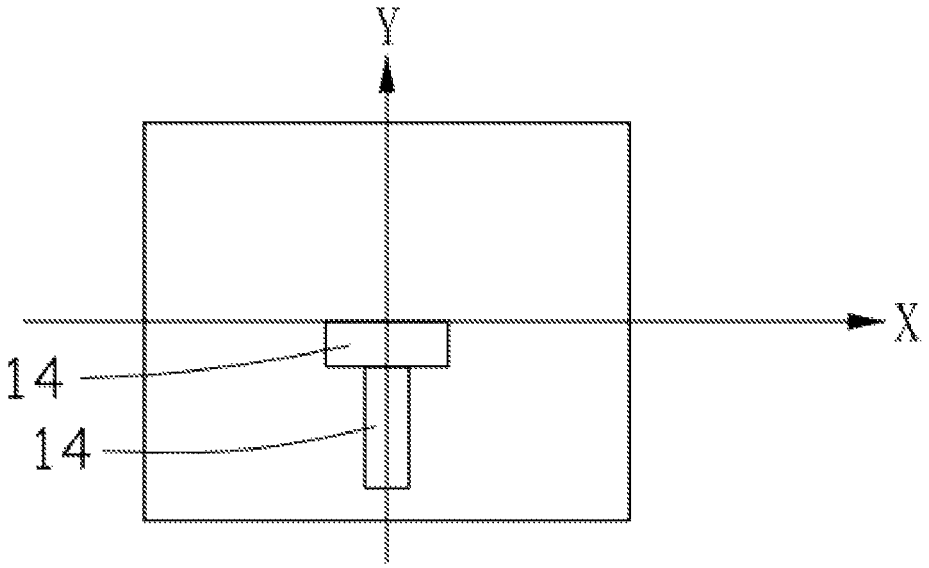
FIG. 4 is a schematic view of measuring a level inclination angle and a vertical inclination angle of a platform using two gravity inductors shown in FIG. 3, wherein the two gravity inductors are orthogonally placed on the center of the platform.

Referring to FIG. 4, a level inclination angle $\alpha$ of the platform in the x direction and a vertical inclination angle $\beta$ of the platform in the y direction may be obtained similarly if two gravity sensors 14 are perpendicularly placed on the center of the platform, i.e., $\alpha = \arcsin [(V_X - V_0)/V]$, and $\beta = \arcsin [(V_Y - V_0)/V]$.

The control unit 16 is positioned in the three-dimensional display device 1 similarly, and is electrically connected to the display panel 10 and the gravity sensor 14. The control unit 16 controls the transverse period and right-and-left movement of an image displayed by the display panel, and further receives the inclination angle data measured by the gravity sensor 14. Based the level inclination angle $\alpha$ and the vertical inclination angle $\beta$ measured by the gravity sensor 14, the control unit 16 may transform the level inclination angle $\alpha$ and the vertical inclination angle $\beta$ into coordinates of the central position of the two eyes of the observer with respect to the display panel 10, and control adjustment direction of the outputted image according to the coordinates so as to adjust arrangement of the image outputted by the display panel 10 in the currently inclined state.

In use, a three-dimensional display tracking method of the present disclosure three-dimensional display device 1 mainly includes the following steps:

step S1, the gravity sensor 14 detects an inclination state of the display panel 10 with respect to the vertical direction;

step S2, the gravity sensor 14 measures the level inclination angle $\alpha$ of the display panel 10 with respect to the horizontal direction and the vertical inclination angle $\beta$ of the display panel 10 with respect to the vertical direction, transmits the level inclination angle $\alpha$ and the vertical inclination angle $\beta$ to the control unit 16;

step S3, the control unit 16 transforms the level inclination angle $\alpha$ and the vertical inclination angle $\beta$ into a position of the central position of the two eyes of the observer with respect to the display panel 10, and adjusts the optimal right-and-left positions of the two images of the display panel 10 in the currently inclined state and outputs them.

In step S3, a process of transforming the level inclination angle $\alpha$ and the vertical inclination angle $\beta$ into the position of the central position of the two eyes of the observer with respect to the display panel 10 is described as follows.

Figure 5:
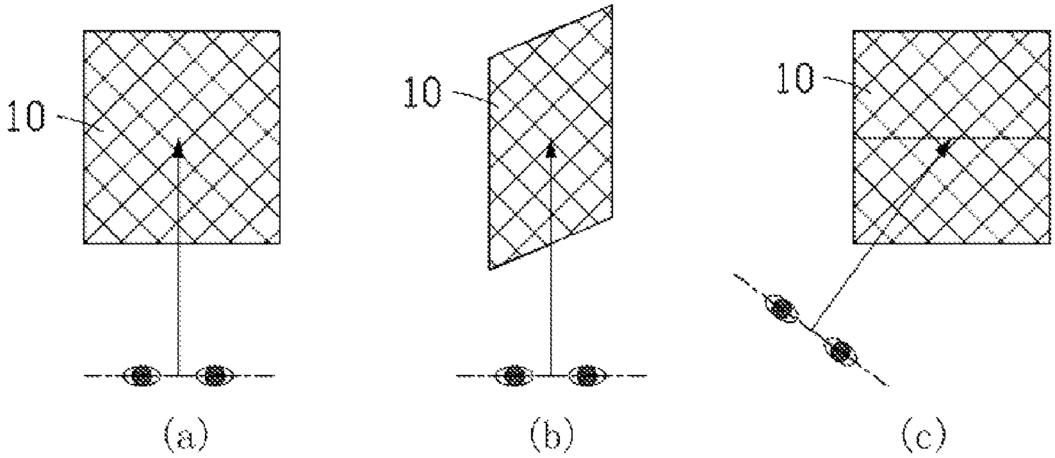
FIG. 5 is a schematic view showing three positional relations between the display panel and observer's eyes.

Referring to FIG. 5, three circumstances are shown on the assumption that a perpendicular distance between the display panel 10 and the two eyes of the observer is L (i.e., an observing distance for the eyes of the observer opposite to the display panel 10) and that a preferred condition is that the distance L is an optimal observing distance. In FIG. 5(*a*), the display panel 10 is perpendicular to a sight line of the two eyes of the observer, and corresponds to the center of the two eyes of the observer. Here, the observer may observe an optimal three-dimensional image. In FIG. 5(*b*), the display panel 10 inclines and deviates from the center of the two eyes of the observer. Here, the observer may not observe a normal three-dimensional image. In FIG. 5(*c*), the position of the display panel 10 is the same with that of the display panel 1 shown in FIG. 5(*a*), but the center of the two eyes of the observer deviates from the optimal observing position. Here, the observer may a three-dimensional display effect similar to that of FIG. 5(*b*).

Figure 6:
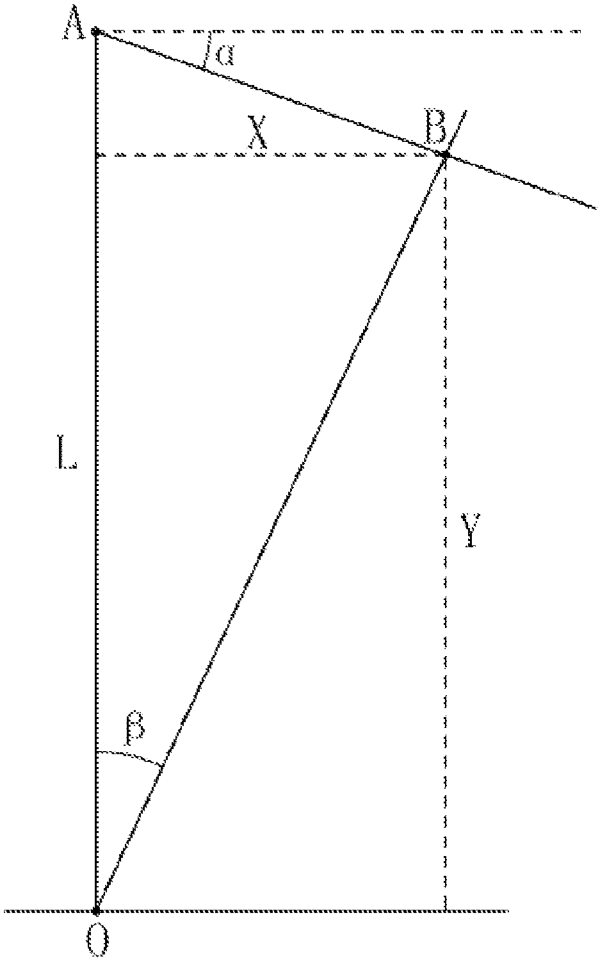
FIG. 6 is a schematic view showing the coordinates when the observer deviates from the display panel horizontally and vertically.

Referring to FIG. 6, which is a schematic view showing that the observer deviates from the display panel 10 horizontally at $\alpha$ angle, and deviates from the display panel 10 vertically at $\beta$ angle. As shown, point O is the center point of the display panel 10, OA is an axis in the vertical direction, and L is the optimal observing distance. An inclination of the display panel 10 may correspond to that the observer deviates from the horizontal direction at $\alpha$ angle, and deviates from the vertical direction at $\beta$ angle. Based on the law of cosines, it may be obtained that $OB=L\cos\alpha/\cos(\alpha-\beta)$, and that the coordinate values X and Y of point B are $X=OB\sin\beta$ and $Y=OB\cos\beta$. Based on the coordinate values X and Y of point B, the control unit 16 adjusts two images displayed on the display panel 10 (i.e., to adjust arrangement of images outputted in the currently inclined state) so that the two eyes of the observer may observe two images respectively and an optimal three-dimensional vision is formed.

In the three-dimensional display device 1 of the present disclosure, a miniature and precise MEMS sensor element is used as the gravity sensor 14 for three-dimensional display tracking of the display panel 10. It is not necessary to set the camera and the display panel 10 at the same side, so a problem that an optimal three-dimensional image may not be observed when the display panel 10 inclines right and left is settled. Also, it is not necessary to correct the camera, and complex data processing is avoided accordingly, so the tracking speed is faster and the cost is relatively lower.

The three-dimensional display device 1 of the present disclosure may be applied to mobile terminal such as mobile telephone, personal digital assistant, portable computer, mobile intelligent machine, etc.

Of course, the gravity sensor 14 may be replaced by a gyroscope which can also sensing a change in an angular velocity of measure a rotation amount of the three-dimensional display device 1. The gyroscope may include a substantially cylindrical resonator mounted in a housing, and a bottom plate attached to the resonator. A plurality of openings are arranged circumferentially and equiangularly on the bottom plate. A plurality of piezoelectric elements arranged between the openings on the bottom plate. The number of openings can be anywhere between 1 and 16, with eight openings preferred, with a corresponding number of piezoelectric elements. Preferably, substantially the entire available area of the bottom plate is taken up by the piezoelectric elements. The piezoelectric elements can be inside or outside the resonator.

The resonator, typically in the shape of a cylinder, designated by in its un-deformed state, is rotated. The vibration modes of the cylinder involve "squeezing" the cylinder along with one of its two axes, thereby forming an ellipse. One of the axes, designated by X, becomes the major axis of the ellipse, and the other one, designated by Y, becomes the minor axis of the ellipse. In essence, the cylindrical resonator alternates between orthogonal states. When the resonator rotates at an angular velocity $\omega$, a second vibration mode starts to appear. This is due to Coriolis force vectors, which result in a Coriolis force in a combined Coriolis vector. Therefore, the added standing vibration wave is oriented at 45 degree relative to the primary vibration mode. The amplitude of the standing wave is related to the angular velocity of the resonator, and is processed electronically to generate a value representative of that angular velocity. If the rotation of the resonator were counterclockwise (instead of clockwise, as shown in the figure), the orientation of the resulting Coriolis force vector would be at 90 degree, and would be detected accordingly.

As described above, the three-dimensional display device 1 of the present disclosure has the advantages of fast tracking speed, high tracking precision and low cost.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present disclosure to the full extent indicated by the broad general meaning of the terms in which the appended claims are expressed.

What is claimed is:

1. A three-dimensional display device, comprising:
- an image displaying device;
- an optical control element positioned adjacent to a surface of the image displaying device;
- a direction sensor adapted for measuring an inclination angle of the image displaying device; and
- a control unit, adapted for adjusting images displayed by the image displaying device according to the inclination angle, wherein the control unit adjusts transverse periods and right-and-left movements of the images displayed by the image displaying device.

wherein:
- the direction sensor is a gravity sensor;
- the inclination angle comprises a first inclination angle of the image displaying device with respect to a horizontal direction and a second inclination angle of the image displaying device with respect to a vertical direction,
- the first inclination angle is $\alpha$ which is expressed as $\alpha=\arcsin[(Vx-V_0)/V]$, and the second inclination angle is $\beta$ which is expressed as $\beta=\arcsin[(Vy-V_0)/V]$, provided that $V_X$ is an output voltage of the direction sensor at the first inclination angle $\alpha$; Vy is an output voltage of the direction sensor at the second inclination angle $\beta$, $V_0$ is an output voltage of the direction sensor in an aclinic state, and V is an output voltage of the direction sensor under acceleration of gravity.

2. The three-dimensional display device of claim 1, wherein the optical control element is a cylindrical lens grating comprising a plurality of micro cylinder lens.

3. The three-dimensional display device of claim 1, wherein a distance between observer's eyes and the image displaying device is expressed as $L\cos\alpha/\cos(\alpha-\beta)$ after the image displaying device inclines, wherein L is an observing distance for the observer's eyes opposite to the image displaying device, and a level coordinate value of the observer's eyes is $[\cos\alpha/\cos(\alpha-\beta)]\cdot\sin\beta$, and a vertical coordinate value is $[L\cos\alpha/\cos(\alpha-\beta)]\cdot\cos\beta$.

4. A mobile terminal, comprising the three-dimensional display device of claim 1.

5. The mobile terminal of claim 4, wherein the optical control element is a cylindrical lens grating comprising a plurality of micro cylinder lens.

6. The mobile terminal of claim 4, wherein a distance between observer's eyes and the image displaying device is expressed as $L\cos\alpha/\cos(\alpha-\beta)$ after the image displaying device inclines, wherein L is an observing distance for the observer's eyes opposite to the image displaying device, and a level coordinate value of the observer's eyes is $[L\cos\alpha/\cos(\alpha-\beta)]\cdot\sin\beta$, and a vertical coordinate value is $[L\cos\alpha/\cos(\alpha-\beta)]\cdot\cos\beta$.

7. A three-dimensional display tracking method, comprising steps of:
- measuring an inclination angle of an image displaying device of a three-dimensional display device;
- adjusting images outputted by the image displaying device in a currently inclined state according to the inclination angle; and
- adjusting transverse periods and right-and-left movements of the images displayed by the image displaying device, wherein:
- the inclination angle comprises a first inclination angle of the image displaying device with respect to a horizontal direction and a second inclination angle of the image displaying device with respect to a vertical direction, the first inclination angle is α which is expressed as $\alpha=\arcsin[(Vx-V_0)/V]$, and the second inclination angle is β which is expressed as $\beta=\arcsin[(Vy-V_0)/V]$, provided that $V_x$ is an output voltage of a direction sensor at the first inclination angle α; Vy is an output voltage of the direction sensor at the second inclination angle β, $V_0$ is an output voltage of the direction sensor in an aclinic state, and V is an output voltage of the direction sensor under acceleration of gravity.

8. The three-dimensional display tracking method of claim 7, wherein the direction sensor is a gravity sensor for measuring the inclination angle.

9. The three-dimensional display tracking method of claim 7, wherein the three-dimensional display device comprises a control unit, and wherein the control unit transforms the inclination angle into a position of observer's eyes with respect to the image displaying device, so as to adjust arrangement of the images outputted by the image displaying device in the currently inclined state.

* * * * *